United States Patent [19]

Rodman et al.

[11] Patent Number: 4,561,051
[45] Date of Patent: Dec. 24, 1985

[54] MEMORY ACCESS METHOD AND APPARATUS IN MULTIPLE PROCESSOR SYSTEMS

[75] Inventors: Paul K. Rodman, Ashland; Joseph L. Ardini, Jr., Needham; David B. Papworth, Framingham, all of Mass.

[73] Assignee: Prime Computer, Inc., Framingham, Mass.

[21] Appl. No.: 578,797

[22] Filed: Feb. 10, 1984

[51] Int. Cl.⁴ .................. G06F 13/00; G06F 15/16
[52] U.S. Cl. ............................................... 364/200
[58] Field of Search ..................... 364/200 MS File

[56] References Cited

U.S. PATENT DOCUMENTS

| | | | |
|---|---|---|---|
| 3,108,257 | 10/1963 | Buchholz | 364/200 |
| 3,435,418 | 3/1969 | Evans et al. | 364/200 |
| 3,469,239 | 9/1969 | Richmond et al. | 364/200 |
| 3,508,205 | 4/1970 | Kubie | 364/200 |
| 3,528,061 | 9/1970 | Zurcher | 364/200 |
| 3,551,892 | 12/1970 | Driscoll | 364/200 |
| 3,568,157 | 2/1971 | Downing et al. | 364/200 |
| 3,573,736 | 4/1971 | Schlaeppi | 364/200 |
| 3,631,405 | 12/1971 | Hoff | 364/200 |
| 3,706,077 | 12/1972 | Mori et al. | 364/200 |
| 3,725,872 | 4/1973 | Balough et al. | 364/200 |
| 3,761,883 | 9/1973 | Alvarez et al. | 364/200 |
| 3,771,146 | 11/1973 | Cotton et al. | 364/200 |
| 4,000,485 | 12/1976 | Barlow et al. | 364/200 |
| 4,037,215 | 7/1977 | Birney et al. | 364/200 |
| 4,038,645 | 7/1977 | Birney et al. | 364/200 |
| 4,050,059 | 9/1977 | Williams et al. | 364/200 |
| 4,073,005 | 2/1978 | Parkin | 364/200 |
| 4,099,243 | 7/1978 | Palumbo | 364/200 |
| 4,136,386 | 1/1979 | Annunziata et al. | 364/200 |
| 4,162,529 | 7/1979 | Suzuki et al. | 364/200 |
| 4,214,304 | 7/1980 | Shimizu et al. | 364/200 |
| 4,245,306 | 1/1981 | Besemer et al. | 364/200 |

*Primary Examiner*—Raulfe B. Zache
*Attorney, Agent, or Firm*—Lahive & Cockfield

[57] ABSTRACT

A multiprocessor data processing system in which a number of independent processors can concurrently operate on a shared memory even when one processor is performing a read-modify-write (RMW) operation, the system having a locking, content-associative write buffer and a controller for identifying RMW requests, for addressing the buffer and, for issuing directives to lock the buffer, to validate particular data blocks in the buffer and to transfer data back and forth between the processors, the memory and the buffer.

12 Claims, 6 Drawing Figures

MEMORY ACCESS METHOD AND APPARATUS IN MULTIPLE PROCESSOR SYSTEMS

BACKGROUND OF THE INVENTION

This invention is in the field of data processing and, in particular, relates to a method and apparatus for the resolution of memory access demands in multiple processor systems.

In many advanced data processing systems, a number of independent processors can have access to a main memory shared by the system. When a processor wishes only to read a particular memory location or even re-write a specified location, access can be controlled sequentially with little cost in performance. However, it is also common for processors to perform an operation known as a read-modify-write (RMW) operation or the like. This operation involves reading data out of a selected memory location, processing the data read out, and writing modified data back into the specified location.

The conventional method for protecting the system from situations in which a second processor seeks access to a location in the middle of a RMW operation has been to freeze the memory bus until the operation is completed; this solution, unfortunately, cuts drastically into performance. In response, systems also have been proposed that use flags, lock bits or the like to deactivate a block of data being manipulated. Nonetheless, a problem remains because when one processor is operating on such locked data, another processor often cannot read the data much less operate upon it concurrently.

The problem of handling multiple access requests can become acute when one of the independent processors is carrying out instructions on a string of data, such as moving a string of ASCII-coded data. Since the 8-bit ASCII words (representing language characters, punctuation, etc.) are smaller than the typical 16 bit (or 32 bit) registers around which advanced systems are designed, a modification which involves changing less than the full 16 (or 32) bits often is not controlled by the system hardware.

For example, a 32-bit wide memory register common to a number of processors can store two data blocks consisting of an integer value (i.e., a fortran *2 integer) on one side (the upper 16 bits) and two ASCII characters on the other side (the lower 16 bits). If a first processor wished to replace the ASCII characters only, it would need to read the entire register, modify the contents to keep the integer value on one side while changing the characters on the other side and then write the modified 32-bits into the memory. Since this RMW operation cannot occur instantaneously, a second processor might write a new entry into part of the register in the interim (i.e., to replace the integer value) and this data would be lost if the first processor was allowed to enter its modification without any controls. Hence, the solution to date has been to exclude the second processor in one fashion or another while the first processor performs a RMW operation.

There exists a need for better memory access systems in which a plurality of processors can share memory locations with a minimum of interruptions. In particular, a long-felt need would be satisfied by an access scheme which would permit other processors to perform RMW operations without freezing the memory bus or completely deactivating a block of data.

SUMMARY OF THE INVENTION

The present invention resides in an improved data processing system and method wherein a plurality of processors can concurrently operate on the system's memory even when one processor is performing a read-modify-write (RMW) operation a particular memory location. The conventional techniques of "freezing" the memory bus or deactivating a block of data are avoided by employing a content-associative write buffer in conjunction with a memory controller which locks the associated location until the read-modify-write operation is completed.

This invention is most useful in data processing systems which employ write-through buffers to control the movement of data between the processors and main memory. In a write-through scheme, a buffer is used to store a series of write instructions from a processor until the memory bus is cleared. Preferably, the buffer is a content associative buffer which also permits a processor seeking to read data to poll the buffer for latest data. In the present invention, the content-associate buffer also permits the controller to control new entries whenever data is undergoing a RMW operation.

In one preferred embodiment a field in microcode is provided for the issuance of a directive whenever a read-modify-write sequence is initiated by a processor. The directive (i.e., "TAKE A LOCK") is dumped into the write buffer at the appropriate address with a tag bit denoting the operation as a lock—not a write, as well as another tag bit identifying the processor. Subsequently processors seeking to merely read data from the same location will not be impeded and such other processors, in fact, can also write new data for insertion into the memory location. However, new data transmitted to the memory location will not be entered but rather will remain in the write buffer until the read-modify-write process of the first processor is completed. Moreover, the microcode instructions further prevent the overwriting of the second processor's data by the first processor, thereby reversing the typical process wherein a second write command to same address in write buffer overrides any data residing there. Thus, uninterrupted processing essentially is maintained for the two processors. This technique can be applied as well to the case of three or more processors by extrapolation.

The invention will next be described in connection with certain preferred embodiments, however, it should be clear that those skilled in the art can make various changes and modifications without departing from the spirit or scope of the invention.

DESCRIPTION OF THE PREFERRED EMBODIMENTS

Figure 1:
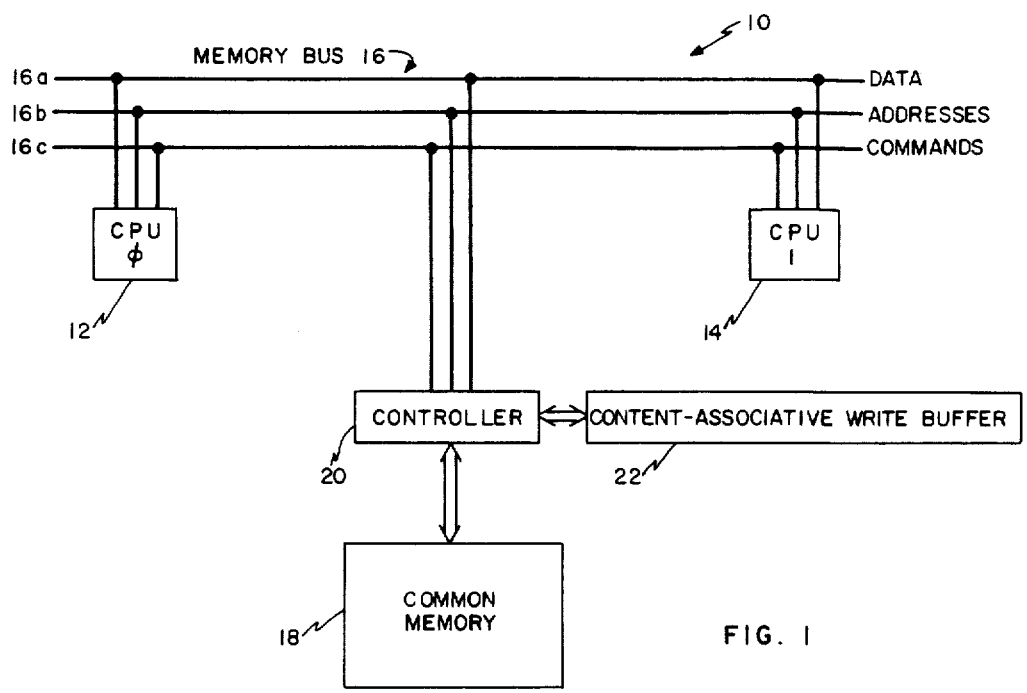
FIG. 1 is a general block diagram of the memory access system of the invention.

In FIG. 1, a general block diagram of the memory access system 10 is shown including at least two processors 12 and 14 connected to a common memory 18 via a memory bus 16 which includes a data path 16a, an address path 16b, and a command path 16c. (Of course, the data, address and command signals could be transmitted by less than three discrete physical lines; for example, all three signals could be multiplexed or otherwise encoded onto a single line). The common memory 18 is typically a high speed MOS memory of about one megabyte although the access system could also be implemented with different types of memories or memories of different sizes.

Interposed between the processors 12, 14 and the memory 18 is a controller 20 and a locking content-associative write buffer 22. The controller 20 is similar is most aspects to conventional controllers used to control access to memory locations. Typically, the controller 20 is implemented by a combination of hardware and firmware (or microcode). In the present invention, controller 20 can include microcode instructions for identifying RMW requests for addressing and formatting the buffer 20, and for issuing the necessary directives as described below to lock particular addresses, and to transfer data back and forth between the processors 12, 14, the memory 18 and the buffer 22. Implementation of the buffer 22 can be achieved with commercially available components or individualized designs by those skilled in the art. Essentially, the content-associative structure is an address-organized buffer accessed by applying the address word. In one preferred embodiment, the structure contains four addressed entries.

Figure 2:
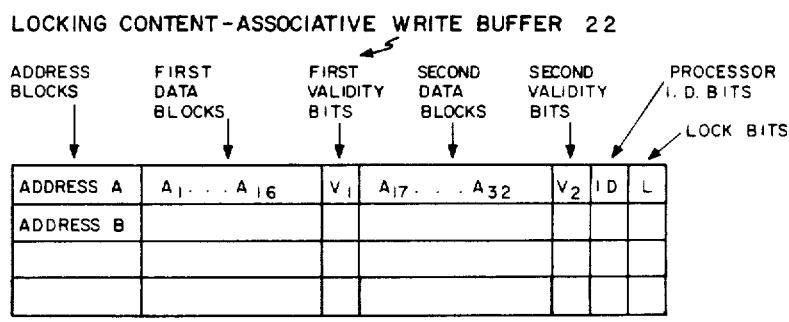
FIG. 2 is a more detailed block diagram of the locking content-associative write buffer of FIG. 1.

The structure of the buffer 22 is shown in more detail in FIG. 2. The buffer includes a plurality of address blocks A, B, etc. Each address in buffer 22 corresponds to a memory location in the main memory 18. Associated with each address are two sixteen-bit strings of data $A_1 \ldots A_{16}$ and $A_{17} \ldots A_{32}$, a validity bit for each string $V_1$, $V_2$, a lock bit L, and at least one bit for identifying the processor that issues the lock directive ID. (For the case of two processors, only one bit is typically needed to distinguish between processors; however, for three or more processors, additional bits would be needed). Each of the two sixteen-bit strings of data stored in buffer 22 is called a "data block". The two data blocks make up a memory data word. In the illustrated embodiment, data is transfered as a block or set of two blocks. Sixteen-bit blocks are the minimum size for a data transmission.

The structure described above is intended for use in a system where the data path of the memory bus can accomodate thirty-two bit wide data transmissions and the operating system is designed to assure the integrity of sixteen-bit block transmissions as well. Of course, the teachings herein can also be applied to sixteen-bit data transmissions and eight-bit data block designs as well.

Figure 3A:
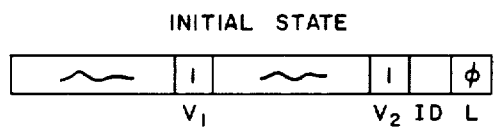
FIGS. 3a-3d are schematic drawings of the memory access process of the invention.
Figure 3C:
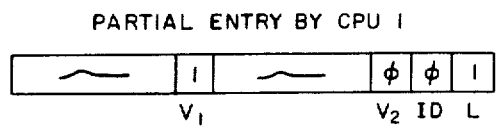
Figure 3B:
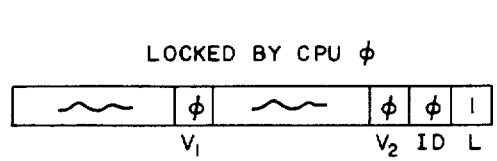

The operation of the memory access scheme is shown schematically in FIGS. 3a through 3d. In FIG. 3a, a single entry in buffer 22 is shown in its initial state containing data from any one of the processors connected to the system. When a RMW operation is initiated by a processor, for example CPU Ø as shown in FIG. 3b, controller 20 sets the lock bit (i.e., to a "1" value) and the validity bits $V_1$ and $V_2$ are initialized as well (i.e., to a "Ø" value) indicating that one of the first or second data blocks is being modified. The processor performing the modification is also identified at the same time by the identification bit ID (i.e., set to "Ø" for CPU Ø).

Since the buffer entry in FIGS. 3a-3d is associated with an address as shown in FIG. 2, this "content-associative" characteristic is used to advantage by controller 22. If during the RMW of the CPU Ø, another processor seeks to execute a write instruction for a particular memory location, controller 22 polls the buffer 20 for the address associated with that location. If the address is not listed in the buffer 22, the processor is allowed to write through the buffer 22 into memory 18.

Figure 3D:
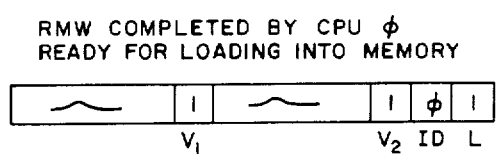

If, on the other hand, the other processor wished to write into one of the memory addresses already stored in the buffer 22 under a lock bit, the controller recognizes the address sought as a locked address and takes the necessary steps to preserve this new data while the RMW operation is being completed. For example, if as shown in FIG. 3c, were to write new data for the first data block, the validity bit $V_1$ associated with that block would be set (i.e., to a "1" value) indicating that this new data is to be saved at the expense of any modified data subsequently written by CPU Ø. (It is assumed that proper programming prevents the second processor from seeking to change that portion of the data in the buffer that is being modified by the first processor). When the first processor completes its modification of data as shown in FIG. 3d, only the portion (i.e., the second data block) that is governed by the validity bit $V_2$ which was not set by CPU1, is entered into the buffer. At this point, both validity bits are set and this state (or the incrementing of the lock bit or the identification bit) informs the controller 20 that this buffer address is ready for loading into memory.

Additions, subtractions, deletions and other modifications of the described preferred embodiments will be obvious to those practiced in the art and are within the scope of the following claims.

We claim:

1. A multiprocessor data processing system comprising
   a main memory having a plurality of addressed locations,
   at least a first and a second processor, each of which can independently read, modify, and write data at said addressed locations,
   a content-associative buffer means having a plurality of content addressable data words, and
   control means connected to said processors, to said memory, and to said buffer means for controlling said read and write operations,
   said control means employing, in response to a locking instruction from a said processor, said content-associative buffer means for altering the otherwise normal sequence of memory write instructions,
   whereby said processors can concurrently access and write at the same main memory addressed location.

2. The multiprocessor data processing system of claim 1 wherein said control means further comprises means for checking said content-associative buffer means for the address of data to be written in main memory and for writing data instead in said content-associative buffer means when said address is found in said buffer means.

3. The multiprocessor data processing system of claim 1 wherein each of said content-addressable data words in said content associative buffer means further comprises at least two separate data blocks.

4. The multiprocessor data processing system of claim 3 wherein said control means further comprises means for writing new data into either of said two separate data blocks independently and means for identifying such data as new data.

5. The multiprocessor data processing system of claim 4 wherein said control means further comprises means for preserving said new data in preference over subsequent write instructions.

6. In a data processing system comprising a plurality of processors, and a main memory having a plurality of addressed locations at which each processor can independently read, modify and wite, the improvement for handling concurrent use of the same memory location comprising:

a content-associative buffer means connected to the processors and the memory for storing data prior to transmission into a memory location, the buffer means having a data structure for each of its entries comprising:
   i. an address block for storing an address which identifies a memory location being read by a first processor;
   ii. at least two separate data blocks associated with each address block;
   iii. a locking block
   iv. a validating block associated with each of said separate data blocks;
and said buffer means having a control means:
   (a) for locking a particular address so that data entered therein by a second processor cannot be transmitted to the memory while the first processor reads, modifies and writes new data;
   (b) for storing and validating new data entered into one of the data blocks from the second processor while the entry address is locked; and for preserving the data entered into the block in preference to modified data written by the first processor;
   (c) for unlocking the particular address when the first processor has completed its modification and has written new data for entry at the address; and
   (d) for transmitting the unlocked data from the buffer means to the main memory location.

7. The system of claim 6 wherein the buffer control means further has a means for identifying the processor that causes a particular address to be locked.

8. The system of claim 6 wherein the buffer means further comprises a buffer with a plurality of entry locations, any of which may be locked by at least one of the processors.

9. A method for handling concurrent requests for access to a main memory location in a data processing system comprising at least a first processor and a second processor and a content-associative memory with a plurality of addressed locations, each of which have a plurality of data blocks, the method comprising the steps of A. determining when a first processor is modifying data from a main memory location and associating an addressed location in a content-associative memory with the main memory location;

B. locking said associated content-associative memory location,

C. storing any new data generated by a second processor for particular data blocks in that main memory location in the locked location;

D. discarding modified data from the first processor addressed to the particular data blocks of the same addressed location in which said new data has been previously stored;

E. storing modified data from the first processor in unmodified data blocks of said locked location, and then unlocking said location, and F. unloading from said location the modified and new data stored by the first and second processors, respectively, into the main memory location.

10. The method of claim 9 wherein the step of locking said associated content-associated memory location further comprises altering a value stored in a locking block associated with said location in the content associative memory.

11. The method of claim 9 wherein the step of storing new data in said data block further comprises altering a value stored in a validating block associated with said data block in the content-associative memory.

12. The method of claim 11 wherein the step of discarding modified data further comprises the step of discarding data when the value stored in the validating block has been changed.

* * * * *